(12) United States Patent
Sip

(10) Patent No.: US 8,248,374 B2
(45) Date of Patent: Aug. 21, 2012

(54) KEYBOARD AND METHOD FOR SELF-DEFINING KEYS ON THE KEYBOARD

(75) Inventor: Kim-Yeung Sip, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 544 days.

(21) Appl. No.: 12/544,235

(22) Filed: Aug. 20, 2009

(65) Prior Publication Data

US 2010/0328218 A1 Dec. 30, 2010

(30) Foreign Application Priority Data

Jun. 26, 2009 (CN) .......................... 2009 1 0303740

(51) Int. Cl.
*G06F 3/023* (2006.01)
(52) U.S. Cl. ....................................................... 345/172
(58) Field of Classification Search .................. None
See application file for complete search history.

(56) References Cited

U.S. PATENT DOCUMENTS

| | | | | |
|---|---|---|---|---|
| 4,633,227 A | * | 12/1986 | Menn | 341/22 |
| 6,441,808 B1 | * | 8/2002 | Hashimoto | 345/173 |
| 7,151,530 B2 | * | 12/2006 | Roeber et al. | 345/168 |
| 7,301,532 B1 | * | 11/2007 | Dobry | 345/172 |
| 7,362,244 B2 | * | 4/2008 | Sun | 341/22 |
| 7,777,725 B2 | * | 8/2010 | Guthrie | 345/168 |
| 2004/0150535 A1 | * | 8/2004 | Sun | 341/22 |
| 2004/0212595 A1 | * | 10/2004 | Zhou | 345/168 |
| 2005/0122313 A1 | * | 6/2005 | Ashby | 345/168 |
| 2006/0022949 A1 | * | 2/2006 | Bathiche | 345/168 |
| 2006/0284847 A1 | * | 12/2006 | Pate et al. | 345/168 |
| 2007/0222761 A1 | * | 9/2007 | Wong et al. | 345/172 |
| 2010/0328218 A1 | * | 12/2010 | Sip | 345/168 |

* cited by examiner

*Primary Examiner* — Peter Vincent Agustin
(74) *Attorney, Agent, or Firm* — Altis Law Group, Inc.

(57) ABSTRACT

A keyboard includes a storage unit, a format generating unit, a character recognizing unit and an assigning unit. The storage unit is configured for storing a plurality of codes, each of the codes corresponds to a character assigned to a key on the keyboard. The format generating unit is configured for analyzing a digital picture reflecting a desired layout of keys on the keyboard and generating a location matrix of the desired layout according to the digital picture and the location matrix. The character recognizing unit is configured for recognizing the characters in the desired layout according to the digital picture and the location matrix. The assigning unit is configured for assigning the codes stored in the storage unit corresponding to the recognized characters to the corresponding keys, based upon the location matrix of the desired layout.

8 Claims, 2 Drawing Sheets

KEYBOARD AND METHOD FOR SELF-DEFINING KEYS ON THE KEYBOARD

BACKGROUND

1. Technical Field

The present disclosure relates to a keyboard and a method for self-defining keys on the keyboard.

2. Description of the Related Art

Keyboards are typically used in electronic devices, such as computers, mobile phones and personal digital assistants. However, most of keyboard layouts are unchangeable. Some layouts are changeable but the changes are limited to a few particular keys. Users cannot discretionarily customize the layout of the keyboard.

Therefore, what is desired is a keyboard and a method for self-defining keys on the keyboard that can overcome the above described limitations.

BRIEF DESCRIPTION OF THE DRAWINGS

Many aspects of the present method for self-defining keyboard could be better understood with reference to the accompanying drawings. The components in the drawings are not necessarily drawn to scale, the emphasis instead being placed upon clearly illustrating the principles of the keyboard and the method for self-defining keyboard. Moreover, in the drawings, like reference numerals designate corresponding parts throughout the several views.

DETAILED DESCRIPTION

Embodiments of the present keyboard and the method for self-defining keys on the keyboard will be now described in detail with reference to the drawings.

Figure 1:
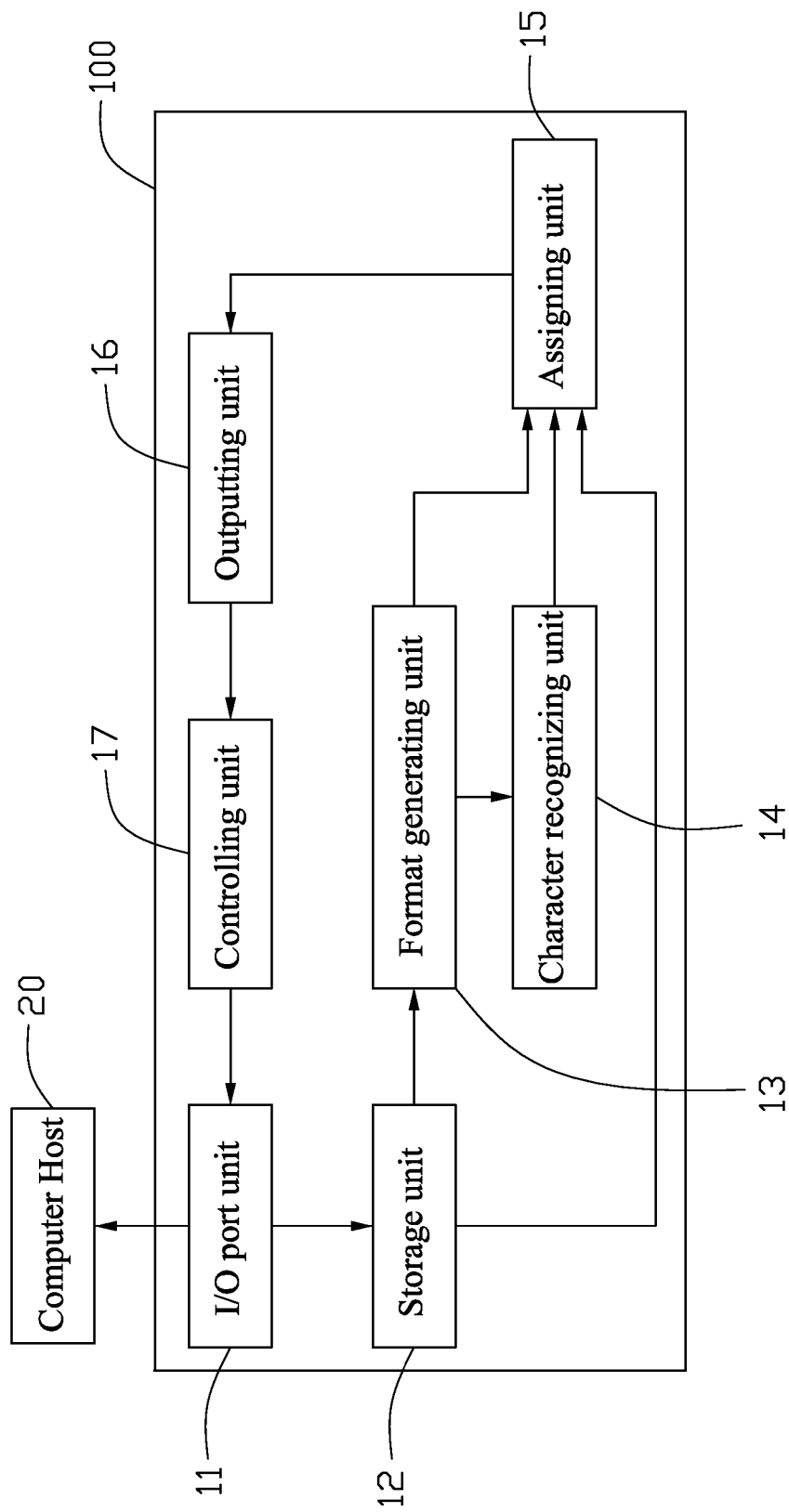
FIG. 1 is a functional block diagram of a keyboard, according to an exemplary embodiment.

Referring to FIG. 1, a keyboard 100 includes a number of keys (not shown), an I/O port unit 11, a storage unit 12, a format generating unit 13, a character recognizing unit 14, an assigning unit 15, an outputting unit 16, and a controlling unit 17.

The I/O port unit 11 is electrically coupled to the controlling unit 17 and the storage unit 12. In this embodiment, the controlling unit 17 is mounted in the keyboard 100. It should be mentioned that the location of the controlling unit 17 is not limited to this embodiment. In other alternative embodiments, the controlling unit 17 can be mounted in a computer host operated by the keyboard 100.

The storage unit 12 can be a semiconductor memory or a magnetic memory for storing a number of codes. Each of the codes corresponds to a character assigned to a key, and the character represents a feature activated by the key when the key is actuated. For example, the code of character "A" is [00000000000000001], and the code of character "B" is [00000000000000010].

In this embodiment, before self-defining the keyboard 100, users obtains and inputs a digital picture reflecting a desired layout of keys into the storage unit 12 via the I/O port unit 11. For example, if a desired layout of keys is to exchange functions of two keys, the users may obtain a digital picture of the desired layout in such a manner: firstly provide two labels, one is labeled with a character, for example "A," and the other is labeled with a character, for example "B;" secondly stick the label with "A" on a key of a keyboard which is originally provided to input the character "B", and stick the label with "B" on a key of the keyboard which is originally provided to input the character "A;" and finally utilize a digital camera to take a digital picture for the keyboard with the two labels. The digital picture reflects the desired layout of keys on the keyboard. The format generating unit 13 is configured for analyzing the digital picture and generating a location matrix of the desired layout, according to the digital picture.

The character recognizing unit 14 is configure for recognizing the characters on the keys in the digital picture. In this embodiment, the character recognizing unit 14 is an optical character recognition (OCR) system.

The assigning unit 15 is configured for assigning the codes stored in the storage unit 12 corresponding to the recognized character to the corresponding key, based upon the location matrix of the desired layout.

The outputting unit 16 is configured for outputting the codes assigned by the assigning unit 15 to the controlling unit 17. The controlling unit 17 is configured for transmitting codes of the self-defined keyboard layout to a computer host 20 via the I/O port unit 11, so that the computer host 20 is able to recognize the desired layout of keys and carry out tasks, i.e., functions in response to actuate on the keys pursuant to the desired layout.

As compared with ordinary keyboards, the keyboard 100 is capable of being discretionarily customized for better personalized experience.

Figure 2:
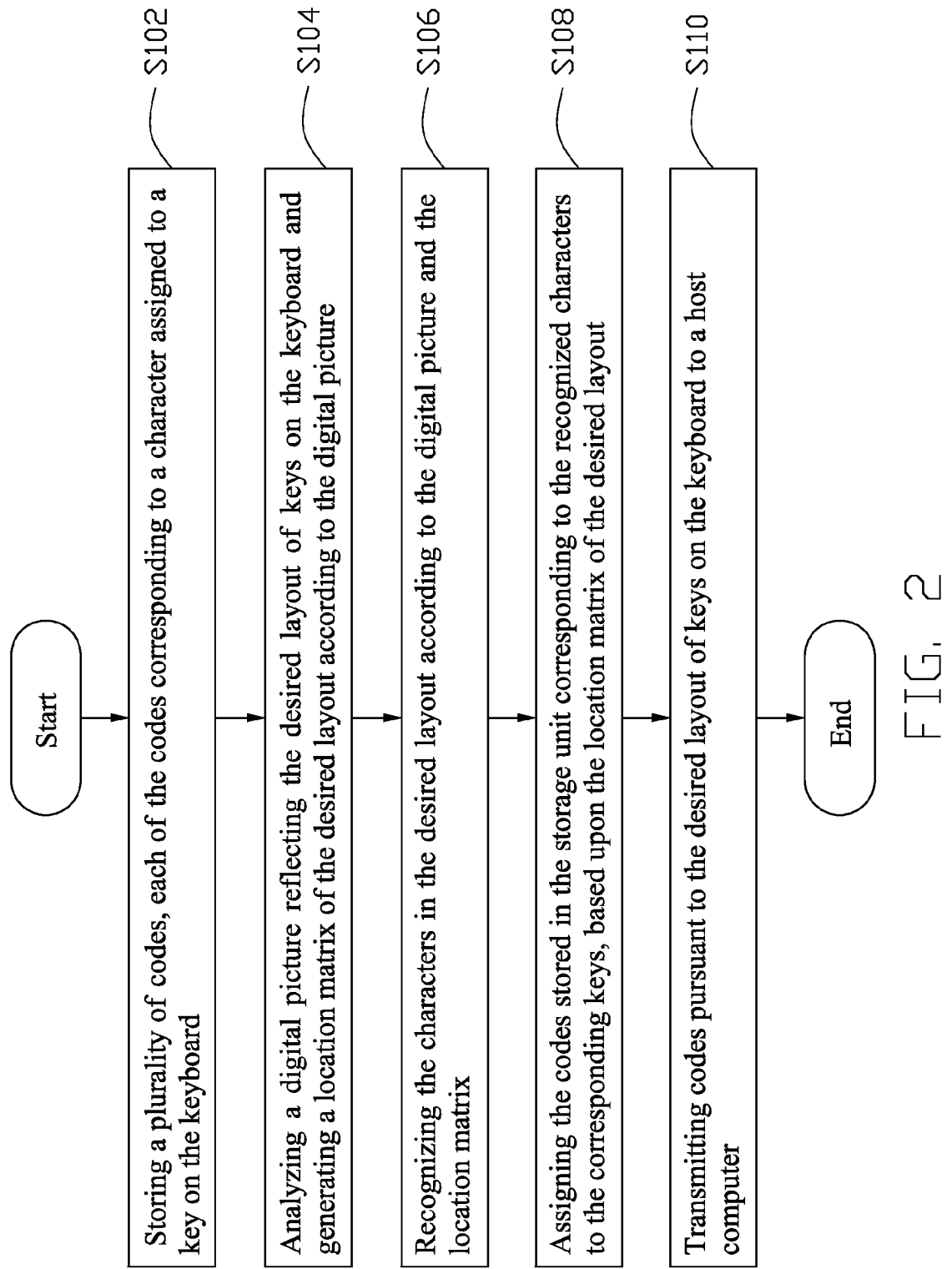
FIG. 2 is a flowchart of a method for self-defining keys on the keyboard of FIG. 1, according to an exemplary embodiment.

Referring to FIG. 2, a flowchart of a method for self-defining the keyboard 100 is shown. The method includes the following steps: in step S102: storing a plurality of codes, each of the codes corresponding to a character assigned to a key; S104: parsing a digital picture reflecting a desired layout of keys on the keyboard and generating a location matrix of the desired layout according to the parsed digital picture; in step S106: recognizing the characters on the desired layout in the parsed digital picture; in step S108: assigning the codes stored in the storage unit corresponding to the recognized characters to the corresponding key, based upon the location matrix of the desired layout; in step S110: transmitting codes of the keyboard to a computer host, so that the computer host is able to recognize the desired layout of keys and carry out tasks, i.e., functions in response to strokes on the keys pursuant to the desired layout.

It will be understood that the above particular embodiments and methods are shown and described by way of illustration only. The principles and the features of the present invention may be employed in various and numerous embodiments thereof without departing from the scope of the invention as claimed. The above-described embodiments illustrate the scope of the invention but do not restrict the scope of the invention.

What is claimed is:

1. A keyboard comprising:

a storage unit configured for storing a plurality of codes, each of the codes corresponding to a character assigned to a key on the keyboard;

a format generating unit configured for analyzing a digital picture reflecting a desired layout of keys on the keyboard and generating a location matrix of the desired layout according to the digital picture;

a character recognizing unit configured for recognizing the characters in the desired layout according to the digital picture and the location matrix; and an assigning unit configured for assigning the codes stored in the storage unit corresponding to the recognized characters to the corresponding keys, based upon the location matrix of the desired layout.

2. The keyboard as claimed in claim 1, further comprising an outputting unit, an I/O port unit, and a controlling unit, the outputting unit is configured for outputting the codes assigned by the assigning unit to the controlling unit, and the controlling unit is configured for transmitting codes of the keyboard to a computer host via the I/O port unit.

3. The keyboard as claimed in claim 1, wherein the storage unit is a semiconductor memory or a magnetic memory.

4. The keyboard as claimed in claim 1, wherein the character recognizing unit is an optical character recognition (OCR) system.

5. The keyboard as claimed in claim 2, wherein the controlling unit is mounted in the keyboard.

6. The keyboard as claimed in claim 1, wherein each character represents a function activated by the key when the key is stroked.

7. A method for self-defining a keyboard comprising:
storing a plurality of codes, each of the codes corresponding to a character assigned to a key on the keyboard;
analyzing a digital picture reflecting the desired layout of keys on the keyboard and generating a location matrix of the desired layout according to the digital picture;
recognizing the characters in the desired layout according to the digital picture and the location matrix; and
assigning the codes stored in the storage unit corresponding to the recognized characters to the corresponding keys, based upon the location matrix of the desired layout.

8. The method for self-defining keyboard as claimed in claim 7, further comprising: transmitting codes pursuant to the desired layout of keys on the keyboard to a computer host.

* * * * *